United States Patent Office 2,771,063
Patented Nov. 20, 1956

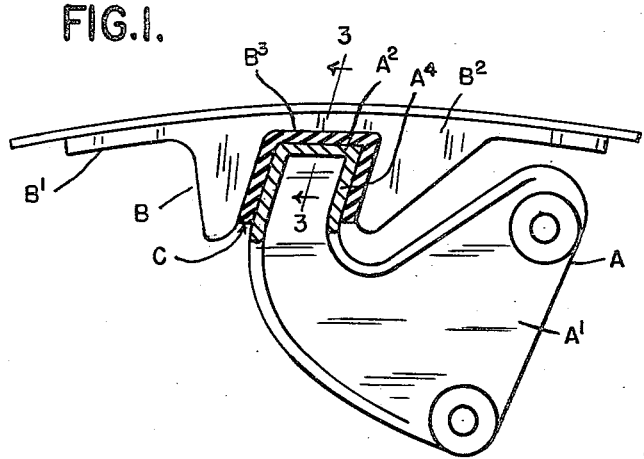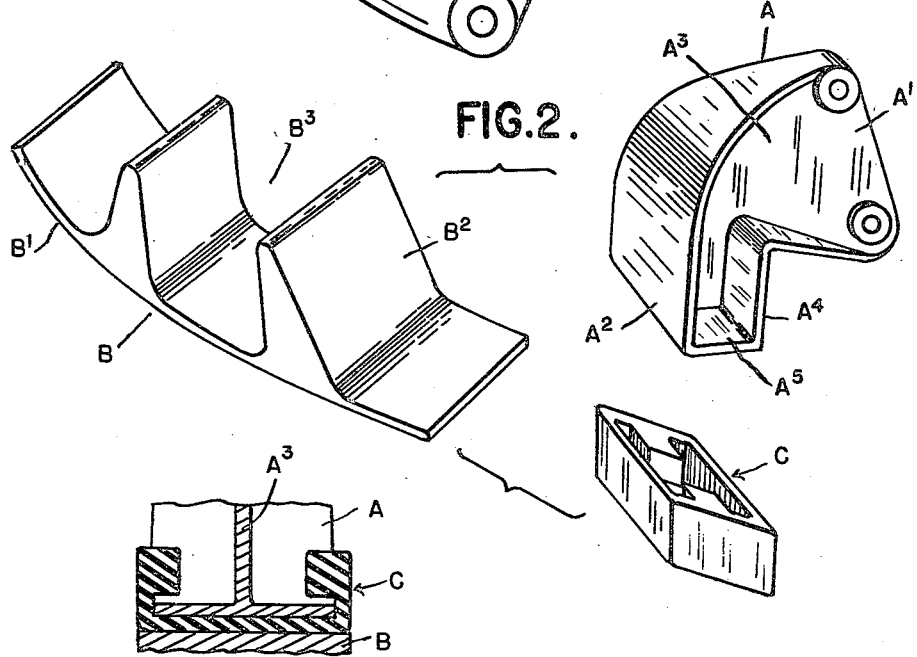

2,771,063

COWL MOUNTING FOR AIRCRAFT ENGINES

George Skistimas, Bryan, Ohio, assignor to The Zeller Corporation, Defiance, Ohio, a corporation of Ohio Application February 7, 1955, Serial No. 486,480

3 Claims. (Cl. 123—41.7)

The invention relates to cowl mountings for aircraft engines of the radial type. It is the object of the invention to obtain a construction in which vibrations are absorbed so as to prevent detrimental stresses in the cowl and mounting members therefor. It is a further object to obtain a simple construction of mounting which can be easily applied and which is relatively low in cost.

With these objects in view the invention consists in the construction as hereinafter set forth.

In the accompanying drawings:

Fig. 1 is an elevation partly in section showing a fragment of the cowl and a mounting therefore applicable to one of the engine cylinders (not shown).

Fig. 2 is a perspective view of the cooperating mounting members and the cushioning means therefor.

Fig. 3 is a section on line 3—3, Fig. 1.

The mounting comprises cooperating bracket members A and B mounted respectively on each of the engine cylinders and the adjacent portion of the cowl. Both members A and B are preferably formed of metal castings, as for instance aluminum alloy. The member B has a base portion B' curved to correspond to the curvature of the cowl and attached thereto by any suitable means. Projecting radially inward from the portion B' is a portion $B^2$ having a socket or recess $B^3$ therein extending across transversely thereof and in a plane that is obliquely inclined to the radius of the curve. The member A has a portion A' for attachment to the engine cylinder and a lug portion $A^2$ adapted to engage the socket $B^3$ of the member B but with clearance on all sides thereof. C is a cushion member formed of rubber like material, such as neoprene, and which is fashioned to form a cap over the lug $A^2$. The walls of the members C are of a thickness to take up the clearance in the socket $B^3$ between the lug $A^2$ and the portion $B^2$ of the member B. The member A is preferably formed with a central web $A^3$ and a peripheral flange $A^4$ extending around to form the lug and upon opposite sides of said web. This leaves recesses $A^5$ which are utilized in securing the member C to the lug $A^2$. Thus, the member C has at its opposite ends inwardly extending portions C', $C^2$ which may be sprung into engagement with the recesses $A^5$ and will hold the member C from accidental disengagement.

With the construction as described a member A is mounted on each of the cylinders of the engine so that the lug $A^2$ thereof extends in a generally radial outward direction. The members B are mounted on the cowl to be in registration with the members A so that the lug $A^2$ with its cap C can be engaged with the socket $B^3$ and when all are thus engaged the cowl will be properly positioned and secured. The cushioning effect of the cap C will absorb all detrimental engine vibrations with the result that the members A and B are protected from destructive stresses.

What I claim as my invention is:

1. In a cowl mounting for radial type multi-cylinder engines including socket members and lug members for engaging the same with clearance therebetween, each lug member being recessed on opposite sides thereof, a resilient cushion cap for said lug formed of rubber like material externally fitting said socket and attachably and detachably engaging said lug being provided with inwardly projecting portions adapted to be sprung into engagement with the recesses of said lug to retain its attachment thereto.

2. The construction as in claim 1 in which said cap is elongated to correspond to the transverse dimension of said lug with portions within the cap projecting inwardly from each end thereof spaced from the sides and adapted to be sprung into said recesses.

3. The construction as in claim 1 in which said lug has a web portion following around three sides of its contour leaving recesses at opposite ends thereof, said inwardly projecting portions of said cap fitting within said recesses.

References Cited in the file of this patent

UNITED STATES PATENTS 2,319,843    Berlin et al.   _____ May 25, 1943
2,642,853    Hinkle   _____ June 23, 1953